Patented Mar. 9, 1948

2,437,465

UNITED STATES PATENT OFFICE 2,437,465

MANUFACTURE OF NEW COLORING MATTERS

Eric Paul Goodings and Maurice Arthur Thorold Rogers, Blackley, Manchester, England, assignors to Imperial Chemical Industries Limited, a corporation of Great Britain No Drawing. Application July 9, 1943, Serial No. 494,124. In Great Britain July 13, 1942

5 Claims. (Cl. 260—240)

This invention relates to the manufacture of new colouring matters.

According to the invention we provide a process for the manufacture of new colouring matters which comprises causing to interact a 2:4-diarylpyrrole of the formula

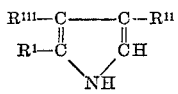

where $R^1$ and $R^{11}$ stand for aryl radicals, for example of the benzene or naphthalene series, substituted or not, the same or different and where $R^{111}$ stands for hydrogen or for a non-reactive substituent, for example an aryl-, alkyl-, alkylamino-, benzylideneamino- or acylamino-radical, with an aldehyde other than a 5-formyl-2:4-diarylpyrrole.

Suitable 2:4-diarylpyrroles include 2:4-diphenylpyrrole, 2-phenyl-4-(p-methoxyphenyl)-pyrrole, 2-(p-methoxyphenyl)-4-phenylpyrrole, 2-(m-hydroxyphenyl)-4-phenylpyrrole, 2-(o-chlorophenyl)-4-phenylpyrrole, 2-(p-acetylaminophenyl)-4-phenylpyrrole, 2-α-naphthyl-4-phenylpyrrole, 2-phenyl-4-β-naphthyl-pyrrole, 2:3:4-triphenylpyrrole, 3-benzoylamino-2:4-diphenylpyrrole, 3-acetylamino-2:4-diphenylpyrrole, 3-benzoylamino-2:4-di-p-tolylpyrrole and 3-acetoacetylamino-2:4-diphenylpyrrole. The preparation of certain of said 2:4-diphenylpyrroles is described in copending application Serial No. 457,229, filed September 3, 1942, now Patent No. 2,382,915, in Serial No. 475,434 filed February 10, 1943, now abandoned, and in corresponding British Patent No. 556,156. Also included are the sulphonic acids of the 2:4-diarylpyrroles, which may be made, for example, by sulphonating the above compounds. The preparation of such sulfonic acids is described in my copending application Serial No. 482,479 filed April 9, 1943, now Patent No. 2,382,917.

Suitable aldehydes include benzaldehyde, 4-dimethylamino-benzaldehyde, 4-(ethyl-β-chloroethylamino)-benzaldehyde, 5-formyl-cresotinic acid, 2-chlorobenzaldehyde, 4-chlorobenzaldehyde, benzaldehyde-4-sulphonic acid, 4-formyldiphenylamine, 4-methoxybenzaldehyde, salicylaldehyde, cinnamaldehyde, 1:3:3-trimethyl-2-formylmethylene-dihydroindole, N-formyl-dihydroindole and 4-formyl-1-phenyl-3-methyl-5-pyrazolone. The aldehydes may be used in the form of their simple functional derivatives, for example, in the form of an oxime or an anil.

By way of explanation the formation of the new compounds of this invention is represented in equation form as follows, it being noted that the 2:4-diarylpyrroles may, by tautomeric interchange, have either the formula A or B:

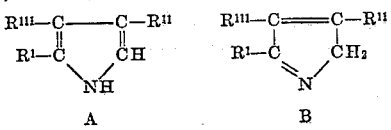

where $R^1$, $R^{11}$ and $R^{111}$ have the significance given above,

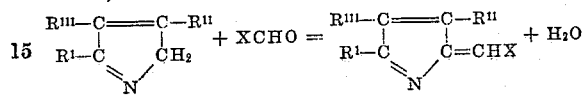

where XCHO is an aldehyde other than a 5-formyl-2:4-diaryl-pyrrole.

In carrying the process of the invention into effect, the ingredients may conveniently be brought into reaction by heating in a mutual solvent, advantageously in the presence of an acidic condensing agent. The products may be isolated and purified by conventional methods.

The new colouring matters are varied in colour and may be used as pigments or for other colouring purposes. In the form of water-soluble derivatives, for example salts, sulphonic acid derivatives or salts of these, the new colouring matters may be used for dyeing.

Water-soluble derivatives may be obtained by forming salts of those of the colouring matters which are sufficiently basic, for example with sulphamic acid, by forming quaternary ammonium salts (when quaternary salt-forming groups are present), or by sulphonation of the colouring matters to yield sulphonic acid derivatives which are in themselves, or in the form of their salts, soluble in water. Alternatively, water-soluble derivatives may be obtained by using as one or both of the ingredients a compound containing one or more water-solubilising groups, for example, sulphonic acid groups.

The invention is illustrated but not limited by the following examples, in which the parts are expressed by weight:

Example 1

3.21 parts of sodium 2:4-diphenylpyrrole monosulphonate are suspended in 50 parts of glacial acetic acid and hydrogen chloride is passed into the boiling suspension until no more is absorbed. 2.01 parts of 1:3:3-trimethyl-2-formylmethylene-dihydroindole are then added followed by 20 parts of acetic anhydride and the mixture is stirred and heated under reflux during 1½ hours. To the liquid is added an equal volume of water, the solution is cooled and 10 parts of 33% aqueous caustic soda solution are added. The crystalline precipitate separates and is collected by filtration. 3.07 parts are obtained. It is recrystallised from 85% formic acid in the form of deep coppery red crystals and it dyes wool in bright red shades from an acid bath.

*Example 2*

To a suspension of 3.26 parts of 2:4-diphenyl-pyrrole disulphonic acid in a solution of 2.08 parts of the anil of 4-formyl-1-phenyl-3-methyl-5-pyrazalone (made by interacting 1-phenyl-3-methyl-5-pyrazalone with formamidine) in 50 parts of methanol, is added 5 parts of concentrated hydrochloric acid. The mixture is stirred and boiled for 1½ hours, during which time the product separates as an orange micro-crystalline solid. The solid is collected by filtration, washed with methanol and dried. It is the free sulphonic acid and 3.04 parts are obtained.

A further quantity of the product may be isolated from the mother liquor in the form of its sodium salt, by rendering the liquor weakly alkaline to Brilliant Yellow with aqueous caustic soda solution. The sodium salt separates in the form of an orange micro-crystalline solid which is collected by filtration washed with ethanol and dried. 2.02 parts are obtained.

The product dyes wool a bright orange shade from an acid bath.

We claim:

1. The process which comprises reacting a 2:4-diphenylpyrrole monosulfonate with 1:3:3-trimethyl - 2 - formylmethylene-dihydroindole suspended in glacial acetic acid in the presence of hydrogen chloride, neutralizing the resulting product with caustic soda and recovering the crystalline precipitate.

2. An unsymmetrical compound of the formula:

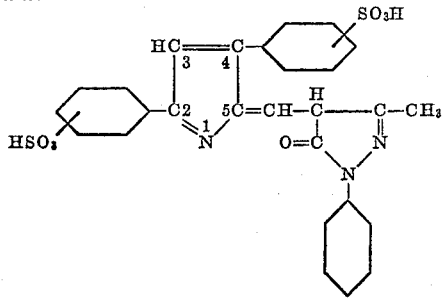

3. An asymmetrical compound containing a single pyrrole radical substituted by aryl radicals in the 2- and 4-positions and having the general formula

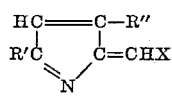

where R' and R" are aryl radicals and X is a cyclic ring structure wherein the atoms are taken from the group consisting of (a) carbon and (b) carbon and nitrogen atoms.

4. A process which comprises causing to interact a compound of the general formula

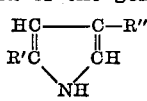

where R' and R" stand for aryl radicals with a cyclic monoaldehyde containing a single ring composed of atoms taken from the groups consisting of (a) carbon atoms and (b) carbon and nitrogen atoms, the two compounds being used in equimolecular proportions and only one of which contains a pyrrole radical substituted by aryl radicals in the 2- and 4-positions, and recovering an unsymmetrical compound of the formula

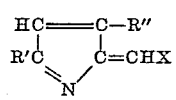

where R' and R" have the above significance and X is a cyclic ring structure wherein the atoms are taken from the group consisting of (a) carbon and (b) carbon and nitrogen atoms.

5. The process which comprises causing to interact a compound of the formula

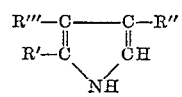

where R' and R" are aryl radicals and R'" is non-reactive with aldehydes and is taken from the group consisting of hydrogen, aryl, alkyl, alkylamino, benzylidene amino and acylamino radicals, with a cyclic monoaldehyde containing a ring composed of atoms taken from the group consisting of (a) carbon atoms and (b) carbon and nitrogen atoms, said compounds being used in equimolecular proportions and only one of which contains a pyrrole radical substituted by aryl radicals in the 2- and 4-positions and recovering an asymmetrical compound of the formula

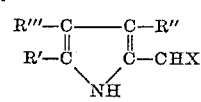

wherein R', and R", and R'" have the above significance and X is a cyclic ring structure wherein the atoms are taken from the group consisting of (a) carbon and (b) carbon and nitrogen atoms.

ERIC PAUL GOODINGS.
MAURICE ARTHUR THOROLD ROGERS.

REFERENCES CITED

The following references are of record in the file of this patent:

UNITED STATES PATENTS

| Number | Name | Date |
|---|---|---|
| 2,233,510 | Brooker et al. | Mar. 4, 1941 |
| 2,245,177 | Bauer et al. | June 10, 1941 |
| 2,289,300 | Wilmanns et al. | July 7, 1942 |

OTHER REFERENCES

Chemical Abstracts, vol. 2, pp. 2240–2241 (citing Berichte, vol. 41, pp. 1127–1156).

Chemical Abstracts, vol. 30, pp. 5980–5981 (citing J. Amer. Chem. Soc., vol. 58, pp. 1091–1090).

Richter, "Textbook of Organic Chemistry" (Wiley & Sons, 1938, New York), page 653.